United States Patent
Helfrich

(10) Patent No.: US 8,358,100 B2
(45) Date of Patent: Jan. 22, 2013

(54) USB DEDICATED CHARGER IDENTIFICATION CIRCUIT

(75) Inventor: Kenneth Helfrich, Duluth, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 582 days.

(21) Appl. No.: 12/611,745

(22) Filed: Nov. 3, 2009

(65) Prior Publication Data

US 2011/0276734 A1   Nov. 10, 2011

(51) Int. Cl.
*H02J 7/00* (2006.01)
(52) U.S. Cl. .................. 320/106; 320/103
(58) Field of Classification Search .......... 320/103, 320/106; 710/11, 14, 15–19, 51, 105, 313–316, 710/107
See application file for complete search history.

(56) References Cited

U.S. PATENT DOCUMENTS

| | | | |
|---|---|---|---|
| 6,256,682 B1 * | 7/2001 | Gudan et al. ................. | 710/14 |
| 6,374,317 B1 * | 4/2002 | Ajanovic et al. ............. | 710/105 |
| 7,581,119 B2 * | 8/2009 | Tupman et al. ............... | 713/300 |
| 7,679,317 B2 * | 3/2010 | Veselic ........................ | 320/107 |
| 7,884,571 B2 * | 2/2011 | Veselic ........................ | 320/107 |
| 7,890,783 B2 * | 2/2011 | Tupman et al. ............... | 713/300 |
| 7,917,781 B2 * | 3/2011 | Ho et al. ..................... | 713/300 |
| 8,154,245 B2 * | 4/2012 | Veselic ........................ | 320/107 |

OTHER PUBLICATIONS

Mark Lai, et al., Battery Charging Specification, Apr. 15, 2009, Revision 1.1, Copyright 2009, USB Implementers Forum, Inc.

* cited by examiner

*Primary Examiner* — Richard V Muralidar
(74) *Attorney, Agent, or Firm* — TIPS Group

(57) ABSTRACT

In an embodiment, set forth by way of example and not limitation, a USB dedicated charger identification circuit includes a USB D+ port, a USB D− port, a first circuit conforming to a first identification protocol, a second circuit conforming to a second identification protocol, and logic selectively coupling one of the first circuit and the second circuit to the USB D+ port and the USB D− port. In an alternate embodiment set forth by way of example and not limitation, a method to provide USB charger identification includes providing a first USB charger identification at a USB D+ port and a D− port. Next, it is detected if the first USB charger identification was inappropriate. Then, if the first USB charger identification was inappropriate, a second USB charger identification is provided at the USB D+ port and the D− port.

3 Claims, 4 Drawing Sheets

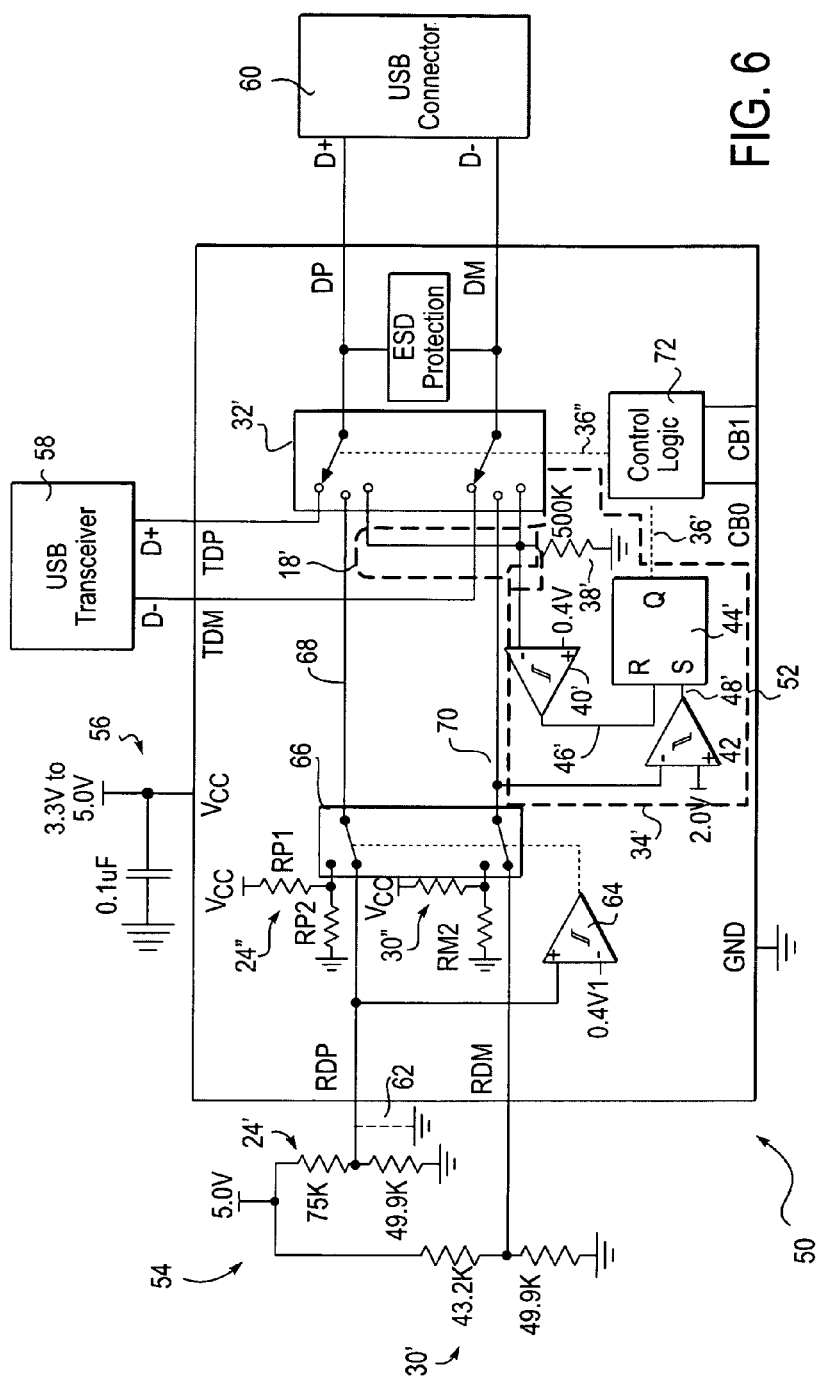
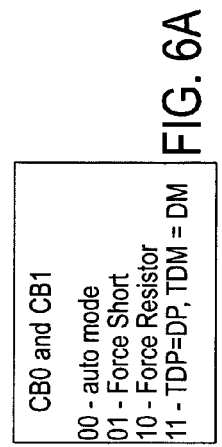
FIG. 6
FIG. 6A

USB DEDICATED CHARGER IDENTIFICATION CIRCUIT

BACKGROUND

The Universal Serial Bus ("USB") was designed to provide a serial communication channel between computers and peripheral devices. For example, USB can connect computer peripherals such as such as mice, keyboards, gamepads, joysticks, scanners, external drives, etc. to a computer. While USB was designed for personal computers it has become commonplace on battery powered computerized devices such as PDAs, music players and cellular telephones which use USB for both data communication and to recharge their batteries. The design of USB is standardized by the USB Implementers Forum (USBIF), an industry standards body incorporating leading companies from the computer and electronics industries.

There are several types of USB connectors approved by the USBIF, including those with four contacts (pins or sockets), such as the USB-A and the USB-B connectors, as well as those with five contacts (pins or sockets), such as the mini/micro-A, mini-micro-B and mini/micro AB. Most computers, including laptop computers, have several USB-A connectors, each of which has a power ($V_{BUS}$) contact, ground (GND) contact and two data line contacts (D+ and D−).

Laptop computers are becoming increasingly popular. In order to preserve battery life, most laptop computers have "inactive" modes where they are not fully on or fully off, such as "sleep", "standby" and certain "hibernate" modes. During operation, such computers are considered to be in their "active" state, and their batteries may last for a number of hours. However, by limiting current draws, the batteries of computers in an "inactive" state can last for days.

With some exceptions, laptop computers can charge compliant USB devices that are plugged into a USB port of the computer when the computers are in an active state. In such cases, the laptop computer is considered to be a "USB host." The devices that can be charged through the USB include, but are not limited to, cellular telephones, music players, PDAs etc., collectively referred to herein as "USB devices." The ability to charge USB devices through the same USB port used for the transfer of data is very convenient and is becoming increasingly popular.

It should be noted that USB devices that do not conform to accepted standards ("non-compliant USB devices") can always draw current from a USB connector that has power on its $V_{BUS}$ contact. However, there is a strong and increasing desire for USB devices to be compliant with USB standards. For example, USBIF rules specify that a USB device (one type of "compliant USB device") can only draw current from a computer when the computer is in an active mode and gives its permission. For example, some laptops will not allow charging through a USB connector if it is running solely on battery power. This means that if a laptop computer is in an inactive mode the USB device cannot be charged through the laptop's USB connector because it cannot communicate with the compliant USB device. Instead, the USB device can be charged by a dedicated USB charger ("dedicated charger") which is essentially a power adapter with an AC input and a USB connector output. The dedicated charger has an identification protocol which lets a USB device know that it is connected to dedicated charger.

There are several dedicated charger identification ("ID") protocols currently being used. One, implemented by Apple Computer, Inc. of Cupertino, Calif. ("Apple"), uses resistive voltage dividers coupled to the D+/D− contacts of the USB connector as illustrated in FIG. 1. More particularly, the circuit inside of an Apple dedicated charger includes a pair of resistive voltage divider circuits, a first of which couples the series connection of a 75 K'Ω resistor and a 49.9 K'Ω resistor between a 5.0 volt voltage source and ground, and a second of which couples the series connection of a 43.2 K'Ω resistor and 49.9 K'Ω resistor between a 5.0 volt voltage source and ground. The center nodes of the two voltage dividers are coupled to the D+ and D− contacts, respectively, of the USB connector. An Apple iPod® or iPhone® USB device (another type of "compliant USB device"), uses a voltage detector to detect the voltages on the D+ and D− contacts as an identification protocol for an Apple dedicated charger.

Another dedicated charger identification protocol is specified by the USBIF. With this protocol, the D+ and D− contacts are shorted as seen in FIG. 2. There is a circuit inside of a compliant USB device as illustrated in FIG. 3 which can detect the short between the D+ and D− contacts to verify that it is connected to a dedicated charger. China has also adopted this convention on a national basis for USB dedicated chargers.

There are other proprietary dedicated charger ID protocols. For example, Motorola uses 5 contact micro and mini USB connectors with its cell phones and has its own proprietary protocols for the identification of dedicated chargers. However, micro and mini USB connectors are not typically provided on laptop computers.

With the USBIF protocol, the circuit inside the USB device detects when the D+ and D− contacts are shorted together. This circuit is illustrated in FIG. 3. When a voltage is detected by the USB device on the USB bus, a voltage is applied to the D+ contact and a load is coupled to the D− contact. Using a window comparator and a debounce timer the circuit determines whether the voltage on the D+ contact is the same as the voltage on the D− contact, identifying whether the D+ and D− contacts are shorted together or not. A description of the current USBIF battery charging specification can be found at www.usb.org/developers/devclass_docs#approved and entitled "Battery Charging Specification, Rev. 1.1, Apr. 15, 2009, incorporated herein by reference.

To address the problem of not being able to charge a compliant USB device on a computer unless it is in an active mode, Fairchild Semiconductor Corporation has proposed a solution as illustrated in FIG. 4. Based upon the limited information available, it is believed that the Fairchild protocol is triggered by the detection of current on the $V_{BUS}$ contact of a USB-A port. Next, it is believed that the device shorts the D+ and D− contacts of the USB-A port to emulate a dedicated charger following the USBIF protocol. However, it is believed that if the current sensed is less than a predetermined threshold level the device determines that the device is an Apple USB device and must reset the Apple USB device detection circuit by cycling $V_{BUS}$ off and then back on again. A DPDT switch is thrown to connect voltage divider resistors to the D+ and D− contacts in conformance with the Apple dedicated charger protocol. If the current sensed with the voltage dividers is greater than the current sensed without the voltage dividers the switch will remain set and the Apple USB device will charge. However, if the current sensed with the voltage dividers is not greater than the current sensed without the voltage dividers, $V_{BUS}$ is again cycled off and on to reset the USB device's detection circuit and the switch is again activated to short the D+ and D− contacts. When the current sensed is zero, the switch is opened and control is reset, with $V_{BUS}$ remaining on to charge the USB device.

While the Fairchild proposal attempts to address the problem of charging Apple and USBIF compliant USB devices from a USB port of an inactive computer, practical implementation details remain significant. First, the $V_{BUS}$ must be monitored. Second, decisions must be made as to current thresholds. Third, $V_{BUS}$ may have to be repeatedly turned off and on as the device iterates through the different possible modes. The circuitry and algorithms of the Fairchild proposal are therefore complex.

These and other limitations of the prior art will become apparent to those of skill in the art upon a reading of the following descriptions and a study of the several figures of the drawing.

SUMMARY

In an embodiment, set forth by way of example and not limitation, a USB dedicated charger identification circuit includes a USB D+ port, a USB D− port, a first circuit conforming to a first identification protocol, a second circuit conforming to a second identification protocol, and logic selectively coupling one of the first circuit and the second circuit to the USB D+ port and the USB D− port. In one example embodiment, the first circuit comprises a pair of voltage dividers which are coupled together in parallel. In another example embodiment, the second circuit is a conductor shorting the USB D+ port and the USB D− port.

In an alternate embodiment set forth by way of example and not limitation, a method to provide USB charger identification includes providing a first USB charger identification at a USB D+ port and a D− port of a USB connector. Next, it is detected if the first USB charger identification was inappropriate. Next, if the first USB charger identification was inappropriate, a second USB charger identification is provided at the USB D+ port and the D− port.

An advantage of an embodiment as described herein is that a USB port of a USB host such as a laptop computer can be made to emulate a plurality of dedicated chargers for USB compliant devices such as cell phones and music players.

It is a further advantage of an embodiment disclosed herein that the USB port of a USB host can automatically provide a dedicated charger identification according to more than one dedicated charger identification protocol.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 6 is a block diagram of another example embodiment of a USB dedicated charger identification circuit.

DETAILED DESCRIPTION OF EXAMPLE EMBODIMENTS

Figure 5:
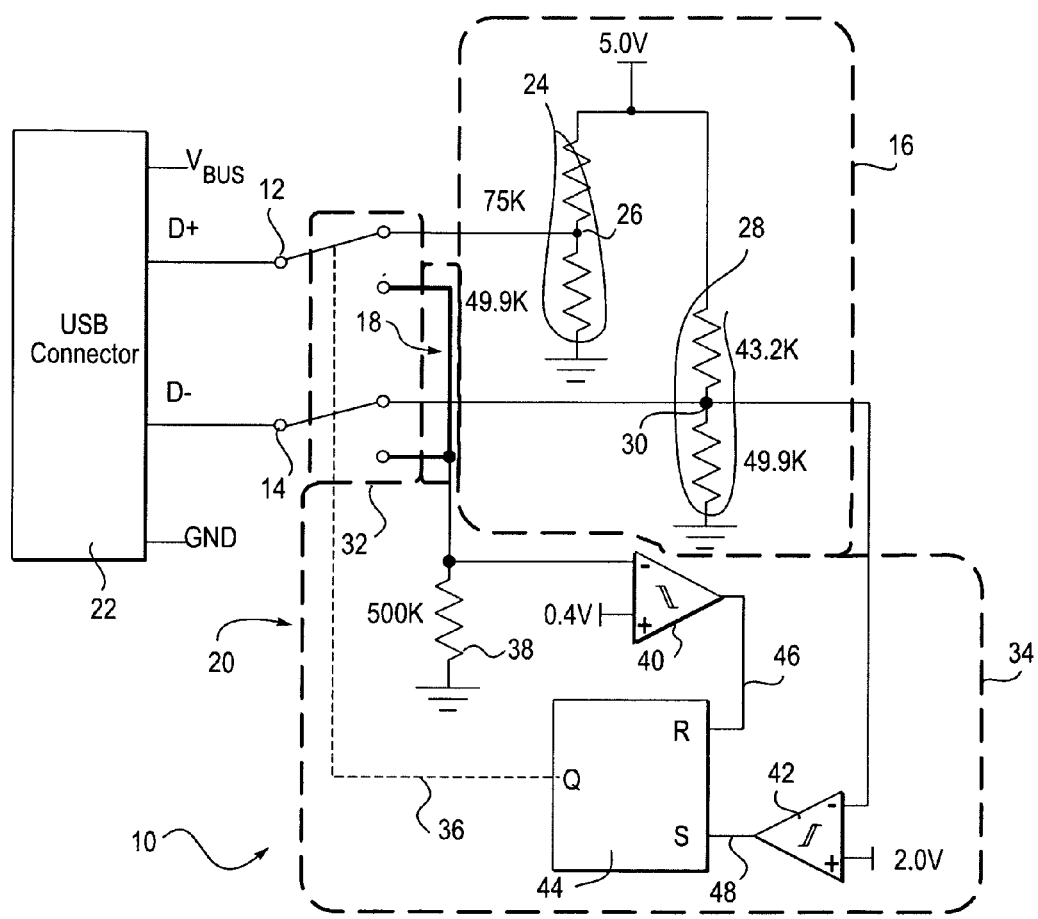
FIG. 5 is a block diagram of an example embodiment of a USB dedicated charger identification circuit.

FIGS. 1-4 were described with reference to the prior art. In FIG. 5, an embodiment of a USB dedicated charger identification circuit 10, set forth by way of example and not limitation, includes a USB D+ port 12, a USB D− port 14, a first circuit 16 conforming to a first identification protocol, and a second circuit 18 conforming to a second identification protocol. The USB dedicated charger 10 further includes logic 20 which is configured to selectively couple one of the first circuit 16 and second circuit 18 to the USB D+ port 12 and the USB D− port 14. Also shown in FIG. 5 is a USB connector 22 which does not form a part of the USB dedicated charger identification circuit 10.

The USB connector 22, in this example embodiment, has four contacts. Two of the contacts, namely $V_{BUS}$ and GND, are for power. The other two contacts, i.e. the D+ contact and the D− contact, are used to carry data. As illustrated in FIG. 5, the D+ contact is coupled to the D+ port 12 of the USB dedicated charger identification circuit 10, and the D− contact is coupled to the USB D− port 14.

In the example embodiment of FIG. 5, the first identification protocol has been selected to be the Apple identification protocol and the second identification protocol has been selected to by the USBIF identification protocol. In other embodiments, these protocols can be reversed, mixed with other protocols, or replaced by other protocols. However, an important feature of the embodiment of FIG. 5 is that it supports multiple, i.e. two or more, dedicated charger identification protocols. In this example, if the circuit 10 were provided within a dedicated charger, that dedicated charger would be operable, for example, with iPods and iPhones (which uses the Apple identification protocol) and with Blackberry devices (which uses the USBIF identification protocol). In this example embodiment, the first circuit 16 is essentially the same as the circuit illustrated in FIG. 1 and the second circuit 18 is essentially the same as the circuit illustrated in FIG. 2.

A non-compliant USB device plugged into USB connector 22 can always draw power from the $V_{BUS}$. However, a USB compliant device can only draw power from the $V_{BUS}$ if it detects a proper dedicated charger identification or if there is proper communication on the D+ and D− data lines to indicate that the USB host (such as a laptop computer) is active. The USB dedicated charger identification circuit 10 of FIG. 5 is therefore useful in a number of applications. For example, if the circuit 10 is provided within a dedicated charger it can become a "universal" charger supporting a number of charger identification protocols or it can be integrated into a computer to allow charging of USB devices even when the computer is in an inactive mode.

With continuing reference to FIG. 5, first circuit 16 includes a first voltage divider 24 having a node 26 and a second voltage divider 28 having a node 30. According to the Apple Communication Protocol, the first voltage divider is the series connection of a 75 K'Ω resistor and a 49.9 K'Ω resistor and the second voltage divider 28 is the series connection of a 43.2K'Ω resistor and a 49.9 K'Ω resistor. This Apple identification protocol, which conforms to the circuit shown in FIG. 1, preferably uses 1% precision resistors. However, as will be discussed in more detail subsequently, it is been found that resistors of lower precision levels may also be suitable. The first voltage divider 24 and the second voltage divider 28 are coupled, in parallel, between a 5.0 voltage source, in this example, and ground.

Figure 1:
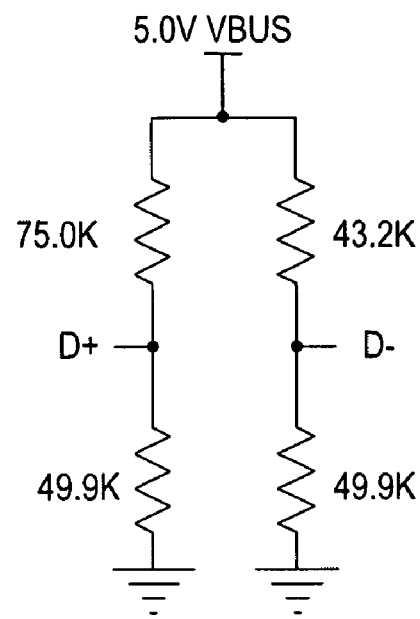
FIG. 1 is a schematic of a prior art circuit inside of a dedicated charger manufactured by Apple Computer, Inc. of Cupertino, Calif.
Figure 2:
FIG. 2 is a diagram illustrating the D+ and D− USB data ports being shorted in accordance with the prior art USBIF dedicated charger protocol.

The second circuit 18, in this example, is very simple. It is simply a conductor which operably shorts the D+ and D− nodes in conformance with to the USBIF identification protocol for a dedicated charger as illustrated in FIG. 2.

Logic 20 selectively couples the circuits 16 and 18 to the USB D+ and USB D− ports. In an embodiment, set forth by way of example and not limitation, the logic 20 includes an electronic switch 32 and control logic 34. Electronic switch 32 is illustrated as a double-pull double-throw (DPDT) switch with the "throws" being coupled to USB D+ and USB D− ports 12 and 14, respectively, and the "poles" being coupled to circuits 16 and 18, respectively. In consequence, when the switch 32 is in a first mode, the first circuit 16 is coupled to the D+ port 12 and D− port 14 and when the switch 32 is in a second mode the circuit 18 is coupled to the D+ port 12 and to the D− port 14. The design and manufacture of electronic switches are well known to those of skill in the art and, as will be appreciated by those of skill in the art, other types of switches can be used including, but not limited to, optical, magnetic, and mechanical switches.

The control logic 34 allows for the automatic operation of the electronic switch 32 via a control line 36. In this example embodiment, the control logic 34 includes a parasitic resistor 38, a comparator 40, a comparator 42, and a bistable multivibrator configured as a latch 44.

The parasitic resistor 38, which in this example is 500 K'Ω, couples the circuit 18 to ground. The comparator 40, in this example, has a negative or "−" input which is also coupled to the circuit 18 and a positive or "+" input coupled to a 0.4 volt reference. An output 46 of the comparator 40 is coupled to the reset or "R" input of the latch 44. The comparator 44 has a negative or "−" input coupled to node 30 of the voltage divider 28 and a positive or "+" input coupled to a 2.0 volt reference. An output 48 of the comparator 42 is coupled to the set or "S" input of the latch 44. The Q output of the latch 44 drives the control line 36.

In this example, the USB dedicated charger ID circuit 10 can provide two identification protocols, namely, the Apple Identification Protocol and the USBIF Identification protocol. When a USB device is connected to USB connector 22, the circuit 10 is in a default Apple identification protocol mode with the circuit 16 coupled to ports 12 and 14 by the switch 32. This is because USB devices conforming to the Apple identification protocol are undetectable at the ports 12 and 14. Therefore, if a USB device conforming to the Apple identification protocol is initially plugged into the USB connector 22, the circuit 10 indicates to the USB device that it is a proper USB dedicated charger and the USB device will charge through the USB connector.

If, however, when a USBIF compliant USB device, such as a Blackberry® "smart phone", is coupled to the USB connector 22, the default identification protocol, in this example, in inappropriate. However, in this embodiment, control logic 34 detects whether a USBIF device is coupled to USB connector 22 and can switch into a USBIF compliant mode.

Figure 3:
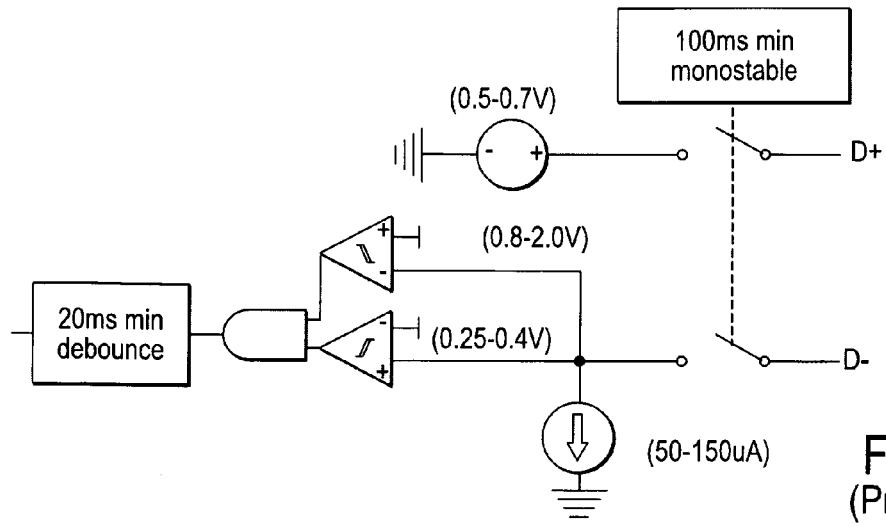
FIG. 3 is a block diagram illustrating the prior art circuit inside of a USB compatible device in accordance with the USBIF standard.
Figure 4:
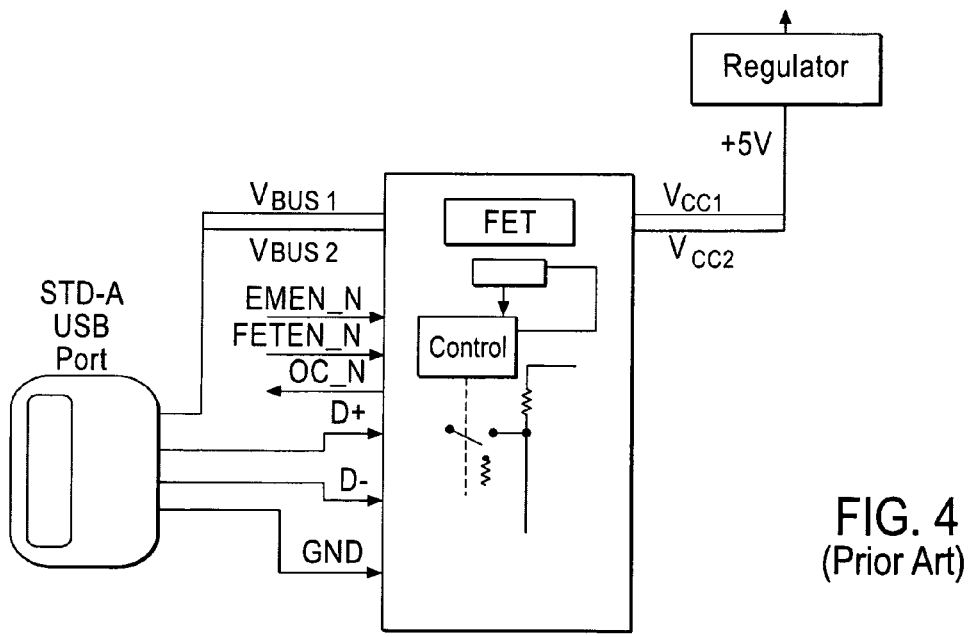
FIG. 4 is a block diagram illustrating a method proposed by Fairchild Semiconductor International, Inc. for emulating dedicated charger devices.

With continuing reference to FIG. 5 and with additional reference to FIG. 3, it should be noted that the USBIF circuit in the USB device includes a current sink coupled to the D− contact. Therefore, coupling a USBIF device to the USB connector 22 will pull node 30 to ground and, in consequence, ground the "−" input to the comparator 42. Since the "−" input is lower than 2.0 volts, the output on line 48 will be HI (e.g. 5 volts) and the latch 44 will be set to provide a Q output of HI or "1" on control line 36. This causes the switch 32 to switch from its first position to a second position where the circuit 18 shorts the D+ and D− lines.

Once the circuit of FIG. 3 detects that the USB host is a USBIF protocol dedicated charger circuit it will decouple from the D+ and D− ports. This will cause the comparator 40 to develop an output on line 46 which resets the latch 44, returning switch 32 to its first or default position.

In FIG. 6, an alternative embodiment of a USB dedicated charger identification circuit 50 is set forth by way of example and not limitation. The circuit 50 may be implemented as an integrated circuit (IC) 52 as will be appreciated by those of skill in the art. The IC 52 is coupled to a number of off-chip components in a typical USB host device, such as a laptop computer. Some of these off-chip components may include a dual voltage divider 54, a power supply 56, a USB transceiver 58 (such as in a Southbridge chip of a PC) and a USB connector 60.

Circuit 50 has many points of similarity with the previously described USB dedicated charger ID circuit 10. Therefore, like components may be given like reference numbers. In an embodiment, a first circuit 54 conforming to a first identification protocol is provided by a customer as an off-chip circuit. The first identification protocol, in this example, is an Apple dedicated charger identification protocol. In other alternate embodiments the first protocol can be a different protocol. The reason why a customer may wish to provide the first circuit off-chip is provide high-precision resistors to fully comply with Apple specifications. That is, high-quality 1% precision resistors, or better, could be used in an off-chip implementation of circuit 54 as illustrated in FIG. 6.

However, it has been discovered that in certain applications the use of expensive, high precision resistors such as in first circuit 54 are not required. In such circumstances, the circuit 54 can be omitted and the RDP pin of the integrated circuit 52 can be coupled to ground as indicated at 62, causing a comparator 64 to activate an electronic switch 66. In this example embodiment the switch 66 is a double-pole double-throw (DPDT) switch which couples internal voltage dividers 24" and 30" to lines 68 and 70, respectively.

It will therefore be appreciated that a customer may utilize the integrated circuit 52 with either an external Apple compliant circuit or to use the built-in Apple compliant circuit by grounding the RDP contact. The advantage of this arrangement is that the internal voltage dividers 24" and 30" can use lower-quality, and therefore less expensive, resistors which meet the voltage requirements of the Apple protocols but which may not meet all requirements of the Apple protocol.

The electronic switch 32', in this non-limiting example, is a double-pole triple-throw (DP3T) switch. That is, the electronic switch 32' of FIG. 6 has one more throw than the electronic switch 32 discussed previously with respect FIG. 5. This extra throw is attached to a USB transceiver 58 which may be, for example, provided in the Southbridge chip of a computer. The other throws can be attached, for example, to the circuits 54 and 18' corresponding to the circuits 16 and 18 of FIG. 5.

The control logic 34 of the USB dedicated charger ID circuit 50 is essentially the same as the control logic 34 described with reference to FIG. 5. However, the control line 36' from the Q output of latch 44' is not coupled directly to the electronic switch 32', but, rather, is coupled to the switch 32' via control logic 72. Control logic 72, in this example, can be programmed by its inputs CB0 and CB1 as indicated by the table at FIG. 6A. When the inputs CB0 and CB1 are both zero, the USB dedicated charger identification circuit 50 is in automatic or "auto" mode and the signal on control line 36' is coupled to control line 36". Alternatively, the control logic 72 can force a short by, for example, applying a "0 1" to the CB0 and CB1 lines, force a "resistor" (e.g. force a connection to the Apple compliant charger identification resistors) by applying a "1 0" to the CB0 and CB1 lines, and coupling the USB transceiver 58 to the D+ and D− contacts of the USB connector 60 by providing a "1 1" at the CB0 and CB1 lines.

It will therefore be appreciated that the chip 52 can be used in a dedicated charger but, in addition, can be used in a USB host such as a laptop computer. When used in a USB host, the control logic 72 can be programmed by the device by, for example, a pull-down menu. When the USB device is active, the USB transceiver takes care of all protocol compliance with respect to USB devices coupled to the USB connector 60 and allows them to be charged through the connector. However, should the USB host go into an inactive mode, the control logic 72 switched into its "auto" mode, in which case the circuit 50 operates, in this example, in a matter as described above.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A USB (Universal Serial Bus) dedicated charger identification circuit comprising:
    a USB D+ port;
    a USB D− port;
    a first circuit conforming to a first identification protocol, said first circuit including a first voltage divider and a second voltage divider coupled in parallel to said first voltage divider;
    a second circuit conforming to a second identification protocol, wherein said second circuit is a conductor;
    logic selectively coupling one of said first circuit and said second circuit to said USB D+ port and said USB D− port;
    wherein said logic couples said first circuit to said USB D+ port and said USB D− port as a default condition;
    wherein said logic includes an electronic switch having at least two poles with at least two throws per pole that couples said first circuit and said second circuit to said USB D+ port and said USB D− port; and
    wherein said logic further comprises circuitry having an input coupled to at least one of said USB D+ port and said USB D− port and an output coupled to a control input of said electronic switch.

2. A USB (Universal Serial Bus) dedicated charger identification circuit comprising:
    a USB D+ port;
    a USB D− port;
    a first circuit conforming to a first identification protocol said first circuit including a first voltage divider and a second voltage divider coupled in parallel to said first voltage divider;
    a second circuit conforming to a second identification protocol, wherein said second circuit is a conductor;
    logic selectively coupling one of said first circuit and said second circuit to said USB D+ port and said USB D− port;
    wherein said logic couples said first circuit to said USB D+ port and said USB D− port as a default condition;
    wherein said logic includes an electronic switch having at least two poles with at least two throws per pole that couples said first circuit and said second circuit to said USB D+ port and said USB D− port; and
    wherein said logic further comprises circuitry having an input coupled to at least one of said USB D+ port and said USB D− port and an output coupled to a control input of said electronic switch by control logic which controls an operational mode.

3. A USB (Universal Serial Bus) dedicated charger identification circuit comprising:
    a USB D+ port;
    a USB D− port;
    a first circuit conforming to a first identification protocol, said first circuit including a first voltage divider and a second voltage divider coupled in parallel to said first voltage divider;
    a second circuit conforming to a second identification protocol, including a conductor;
    logic selectively coupling one of said first circuit and said second circuit to said USB D+ port and said USB D− port;
    wherein said logic couples said first circuit to said USB D+ port and said USB D− port as a default condition;
    wherein said logic includes an electronic switch having at least two poles with at least two throws per pole that couples said first circuit and said second circuit to said USB D+ port and said USB D− port; and
    wherein said logic further comprises circuitry having an input coupled to at least one of said USB D+ port and said USB D− port and an output coupled to said electronic switch, wherein said logic comprises a bistable multivibrator.

\* \* \* \* \*